(12) United States Patent
Nakamura

(10) Patent No.: US 8,037,606 B2
(45) Date of Patent: Oct. 18, 2011

(54) METHOD OF PRODUCING MECHANISM FOR CONVERTING ROTATIONAL MOTION INTO LINEAR MOTION

(75) Inventor: Kiyoharu Nakamura, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 846 days.

(21) Appl. No.: 12/089,541

(22) PCT Filed: Jun. 22, 2007

(86) PCT No.: PCT/JP2007/062610
§ 371 (c)(1),
(2), (4) Date: Apr. 8, 2008

(87) PCT Pub. No.: WO2008/015854
PCT Pub. Date: Feb. 7, 2008

(65) Prior Publication Data
US 2008/0222892 A1  Sep. 18, 2008

(30) Foreign Application Priority Data

Aug. 3, 2006  (JP) ................................. 2006-212326

(51) Int. Cl.
*B21D 53/28* (2006.01)
*F16H 3/06* (2006.01)
*F16H 29/20* (2006.01)
*F16H 57/08* (2006.01)

(52) U.S. Cl. .......... 29/893.1; 29/893; 29/893.2; 29/428; 74/89.23; 74/89.31; 74/89.34; 475/331

(58) Field of Classification Search ................ 29/893.1, 29/466, 464, 428; 74/89.23, 89.3, 89.31, 74/89.36, 89.37, 424.75, 424.921, 424.92; 188/129–130, 134; 475/331
See application file for complete search history.

(56) References Cited

U.S. PATENT DOCUMENTS 4,526,053 A * 7/1985 Carson ........................ 74/424.92
(Continued)

FOREIGN PATENT DOCUMENTS
JP  64-500214  1/1989
(Continued)

OTHER PUBLICATIONS

Supplementary European Search Report mailed on Jul. 19, 2011, issued for EP Application No. EP 07 76 7418 (with English Translation).

*Primary Examiner* — David Bryant
*Assistant Examiner* — Alexander P Taousakis
(74) *Attorney, Agent, or Firm* — Oblon, Spivak, McClelland, Maier & Neustadt, L.L.P.

(57) ABSTRACT

A method for fabricating a rotational-to-linear motion conversion mechanism which can avoid a planetary shaft from being tilted with respect to a sun shaft when the conversion mechanism is assembled. The method includes fabricating a subassembly with the planetary shaft being held in parallel to the sun shaft. The subassembly includes the sun shaft having a first and second sun gear at its opposing ends and a male thread at its center, the planetary shaft having a first planetary gear at its one end and a male thread at its center, a ring shaft having a female thread, and a first and second ring gear. The method also includes mating the second planetary gear with the second sun gear and the second ring gear while the second planetary gear is being fitted over the outer circumferential surface of the other end of the planetary shaft in the subassembly.

4 Claims, 15 Drawing Sheets

U.S. PATENT DOCUMENTS

| | | |
|---|---|---|
| 2009/0288509 A1 | 11/2009 | Hori et al. |
| 2010/0170077 A1 | 7/2010 | Kinoshita et al. |

FOREIGN PATENT DOCUMENTS

| | | |
|---|---|---|
| JP | 11-159593 | 6/1999 |
| JP | 2000 500215 | 1/2000 |
| JP | 2005 325894 | 11/2005 |
| JP | 2006-64057 | 3/2006 |
| JP | 2007 56952 | 3/2007 |
| JP | 2007-107594 | 4/2007 |
| SU | 1283465 | 1/1987 |
| WO | WO 88/00295 | 1/1988 |
| WO | 2004 094870 | 11/2004 |
| WO | 2005 124188 | 12/2005 |
| WO | WO 2007/148789 A1 | 12/2007 |
| WO | WO 2007/148790 A1 | 12/2007 |

\* cited by examiner

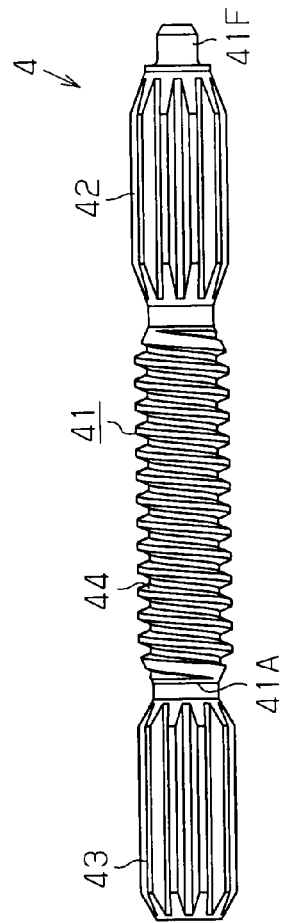
Fig.4A
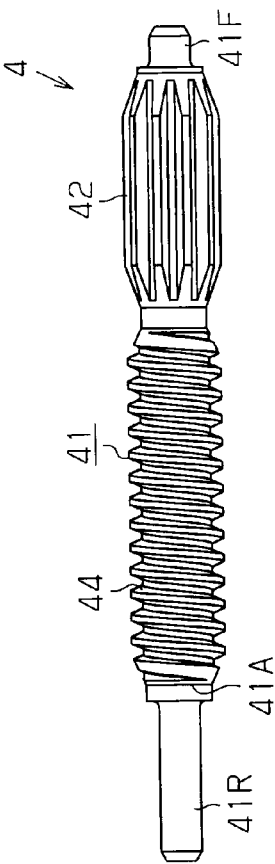
Fig.4B
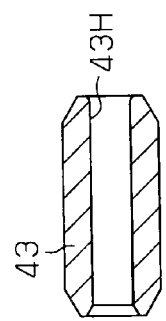
Fig.4C
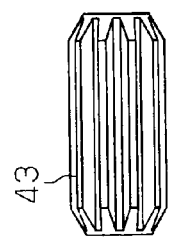

METHOD OF PRODUCING MECHANISM FOR CONVERTING ROTATIONAL MOTION INTO LINEAR MOTION

FIELD OF THE INVENTION

The present invention relates to a method for fabricating a rotational-to-linear motion conversion mechanism.

DISCUSSION OF THE BACKGROUND

For example, as a rotational-to-linear motion conversion mechanism, one described in Patent Document 1 is known.

This conversion mechanism includes a pipe-shaped ring shaft, a sun shaft disposed inside the ring shaft to extend coaxially with the ring shaft, and a plurality of planetary shafts disposed between the sun shaft and the ring shaft to extend in the same direction as do the sun shaft and the ring shaft. A female thread is formed on the inner circumference of the ring shaft and a male thread is formed on the outer circumference of the sun shaft and on the outer circumference of the planetary shaft. The male thread of the planetary shaft is mated with the male thread of the sun shaft and the female thread of the ring shaft.

In the conversion mechanism configured as above, a rotational motion of the ring shaft will cause the planetary shaft to make a planetary motion, i.e., to rotate about its own axis while rotating about the axis of the sun shaft. The planetary motion of the planetary shaft in turn produces an axial linear motion of the sun shaft. The aforementioned conversion mechanism thus converts the rotational motion of the ring shaft to the linear motion of the sun shaft.

Patent Document 1: WO2004/094870 A1

In a process of fabricating the rotational-to-linear motion conversion mechanism, the inventor found that the planetary shaft is tilted between the ring shaft and the sun shaft from the parallel position (i.e., a position in which the axis of the planetary shaft is parallel to the axis of the sun shaft). The planetary shaft is possibly tilted in this manner for the following reason.

In the conversion mechanism, the number of threads of each component is set to a different value. Accordingly, engagements between the female thread of the ring shaft, the male thread of the sun shaft, and the male thread of each planetary shaft would produce backlash therebetween. The magnitude of backlash may vary depending on the setting of each number of threads. For this reason, in the process of fabricating the conversion mechanism, force acting radially upon the planetary shaft would cause the planetary shaft to displace and tilt with respect to the sun shaft by the amount of the backlash. Under this condition, each component of the conversion mechanism is fabricated.

In the conversion mechanism having the planetary shaft tilted with respect to its parallel position, the threads of each component are mated unevenly with each other, thereby accelerating local wearing of the threads with loss of service life. This also causes an increase in friction between the components, resulting in a decrease in the efficiency of conversion from rotational to linear motion.

SUMMARY OF THE INVENTION

It is therefore an object of the present invention to provide a method for fabricating a rotational-to-linear motion conversion mechanism which can avoid the planetary shaft from being tilted with respect to the sun shaft when the conversion mechanism is assembled.

In order to achieve the aforementioned object, the present invention provides a method for fabricating a rotational-to-linear motion conversion mechanism. The conversion mechanism includes a pipe-shaped ring shaft having a female thread on its inner circumferential surface at its longitudinal center portion; a sun shaft disposed inside the ring shaft to extend coaxially with the ring shaft, the sun shaft having a male thread on its outer circumferential surface at its longitudinal center portion; a plurality of planetary shafts disposed between the outer circumferential surface of the sun shaft and the inner circumferential surface of the ring shaft to extend in the same direction as do the sun shaft and the ring shaft, each of the planetary shafts having a male thread on its outer circumferential surface at its longitudinal center portion, the male thread being mated with the female thread of the ring shaft and the male thread of the sun shaft; a first ring gear secured to an inner circumferential surface of a first longitudinal end portion of the ring shaft; a first sun gear integrated on an outer circumferential surface of a first longitudinal end portion of the sun shaft; a first planetary gear integrated on an outer circumferential surface of a first longitudinal end portion of the planetary shaft, the first planetary gear being mated with the first ring gear and the first sun gear; a second ring gear secured to an inner circumferential surface of a second longitudinal end portion of the ring shaft; a second sun gear secured to an outer circumferential surface of a second longitudinal end portion of the sun shaft; and a second planetary gear attached to an outer circumference of a second longitudinal end portion of the planetary shaft, the second planetary gear being circumferentially rotatable about its own axis and mated with the second ring gear and the second sun gear. The method includes fabricating a subassembly while the planetary shaft is being held in parallel to the sun shaft, the subassembly including the sun shaft having the first and second sun gears, the planetary shaft having the first planetary gear, the ring shaft, and the first and second ring gears. The method includes mating the second planetary gear with the second sun gear and the second ring gear while the second planetary gear is being fitted over the outer circumferential surface of the second end portion of the planetary shaft in the subassembly.

To smoothly fit the second planetary gear over the second end portion of the planetary shaft, it is preferable that the phases of the first sun gear and the second sun gear around the axis of the sun shaft be the same and that the phases of the first ring gear and the second ring gear around the aforementioned axis be the same. In this case, the relative phase of the first ring gear around the aforementioned axis with respect to the first sun gear is equal to the relative phase of the second ring gear around the aforementioned axis with respect to the second sun gear.

However, at the time of the fitting, the phases of the first sun gear and the second sun gear around the axis of the sun shaft are not always the same but may be different from each other. Even in this situation, the second planetary gear can be rotated about its own axis, or around the axis of the planetary shaft, by an amount of phase shift of the second sun gear around the axis of the sun shaft with respect to the first sun gear. This makes it possible to mate the second planetary gear with the second sun gear while the second planetary gear is being fitted over the outer circumferential surface of the second end portion of the planetary shaft.

Furthermore, at the time of the fitting, whether the phases of the first sun gear and the second sun gear around the axis of the sun shaft are the same or different, the relative phase of the second ring gear around the aforementioned axis with respect to the second sun gear will be different from the relative phase of the first ring gear around the aforementioned axis with respect to the first sun gear, depending on the phase of the first ring gear and that of the second ring gear around the axis of the sun shaft. Even in this situation, it is possible to mate the second planetary gear with the second sun gear and the second ring gear while the second planetary gear is being fitted over the outer circumferential surface of the second end portion of the planetary shaft. That is, when mated with the second sun gear, the second planetary gear can rotate about its own axis by an amount of backlash therebetween. Accordingly, even when the relative phase of the second ring gear around the axis of the sun shaft with respect to the second sun gear is different from the relative phase of the first ring gear around the aforementioned axis with respect to the first sun gear, the second planetary gear can be mated with the second ring gear through the rotation of the second planetary gear about its own axis within the range of the aforementioned backlash.

The reason for the planetary shaft being tilted with respect to the sun shaft when the conversion mechanism is fabricated is, for example, that the second planetary gear is displaced in the circumferential direction of the sun shaft relative to the first planetary gear which is at the first end portion of the planetary shaft when the second planetary gear is fitted over the second end portion of the planetary shaft. However, when the second planetary gear is fitted over the outer circumferential surface of the second end portion of the planetary shaft, the second planetary gear, while rotating about its own axis as appropriate around the axis of the planetary shaft, moves axially to mate only with the second sun gear and the second ring gear. Accordingly, when fabricated, the second planetary gear will not be pushed in the circumferential direction of the sun shaft, and the sun shaft will not be displaced circumferentially, either. Accordingly, upon fabrication, it is possible to prevent the planetary shaft from being tilted with respect to the sun shaft due to the second planetary gear being displaced in the circumferential direction of the sun shaft relative to the first planetary gear which is at the first end portion of the planetary shaft.

According to an aspect of the present invention, it is preferable that the method further includes, prior to the step of fabricating the subassembly, the step of integrating the first sun gear and the second sun gear with the sun shaft so that the first and second sun gears are in phase around the axis of the sun shaft.

To stabilize the rotational motion of the planetary shaft about its own axis and the sun shaft when the conversion mechanism is actuated, the conversion mechanism is preferably adapted to eliminate the phase shift between the first sun gear and the second sun gear around the axis of the sun shaft and the difference in the timing between the first sun gear and the second sun gear at which force is transferred between the planetary shaft and the sun shaft. The aforementioned fabrication method can preferably eliminate such a difference in the transfer timing, thereby stabilizing the rotational motion of the planetary shaft about its own axis and the sun shaft when the conversion mechanism is actuated.

According to another aspect of the present invention, the method further includes, prior to the step of fabricating the subassembly, the steps of disposing each of the planetary shafts circumferentially around the sun shaft and then engagedly attaching a jig extending in parallel to the planetary shaft to each adjacent first planetary gear of the planetary shafts, and removing the jig after the step of mating the second planetary gear.

According to the aforementioned fabrication method, each planetary shaft placed along the circumference of the sun shaft can be precisely held in parallel to the sun shaft using the jig. The subassembly is fabricated in this arrangement, and the second planetary gear is fitted over the outer circumferential surface of the second end portion of the planetary shaft in the subassembly. After the fitting, the jig is removed. Accordingly, when the subassembly is fabricated and when the second planetary gear is fitted over to the outer circumferential surface of the second end portion of the planetary shaft, the inclination of the planetary shaft relative to the sun shaft is prevented with the jig.

BRIEF DESCRIPTION OF THE DRAWINGS

FIG. 4A is a side view illustrating a planetary shaft of the conversion mechanism, FIG. 4B is a side view illustrating the planetary shaft when disassembled, and FIG. 4C is a cross-sectional view illustrating the cross-sectional structure of a rear planetary gear, taken along its center line;

DETAILED DESCRIPTION OF THE PREFERRED EMBODIMENTS

Now, an embodiment of the present invention will be explained below with reference to FIGS. 1 to 23.

Figure 1:
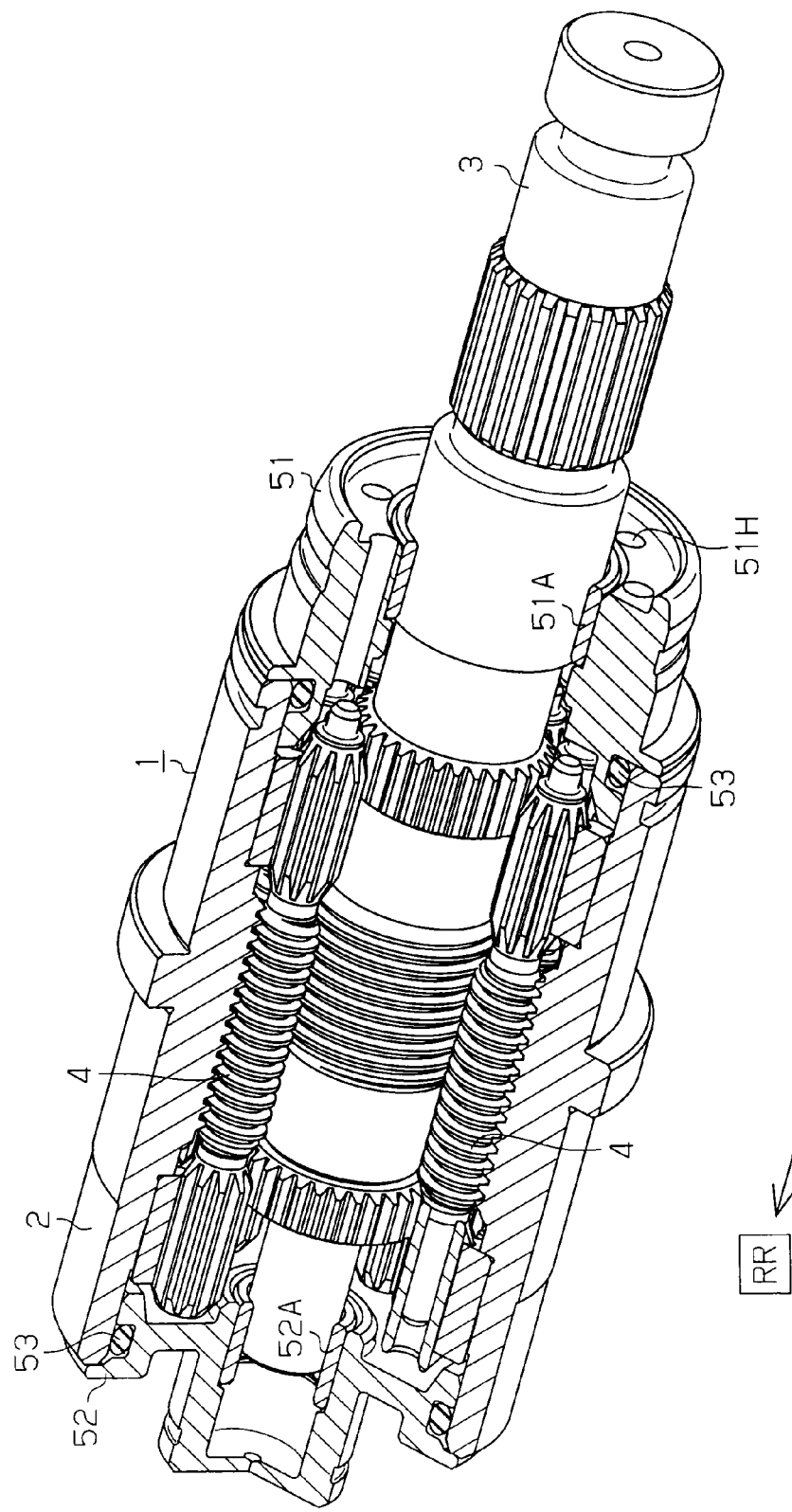
FIG. 1 is a perspective view illustrating the internal structure of a rotational-to-linear motion conversion mechanism according to an embodiment of the present invention.

As illustrated in FIG. 1, a rotational-to-linear motion conversion mechanism 1 includes a pipe-shaped ring shaft 2 with a space extending axially therein, a sun shaft 3 disposed inside the ring shaft 2 to extend coaxially with the shaft 2, and a plurality of planetary shafts 4 disposed around the sun shaft 3 in parallel to the sun shaft 3 and the ring shaft 2.

The sun shaft 3 penetrates a front collar 51 secured onto the inner circumferential surface which forms a first longitudinal end opening portion of the ring shaft 2. The sun shaft 3 is also inserted into a rear collar 52 secured onto the inner circumferential surface which forms a second longitudinal end opening portion of the ring shaft 2. The sun shaft 3 is supported by a bearing 51A provided on the front collar 51 and a bearing 52A provided on the rear collar 52.

The first longitudinal end opening portion of the ring shaft 2 is blocked with the front collar 51, and the second longitudinal end opening portion is blocked with the rear collar 52. An O-ring 53 is mounted in each portion of the front collar 51 and the rear collar 52, which faces the inner circumferential surface forming each opening portion and makes contact with the inner circumferential surface to seal the ring shaft 2. The front collar 51 also includes a lubricant inlet 51H through which a lubricating oil is supplied into the ring shaft 2.

Inside the ring shaft 2, the thread and gear provided on each planetary shaft 4 are mated with the thread and gear provided on the ring shaft 2 and the thread and gear provided on the sun shaft 3. This mating allows the planetary shaft 4 to be supported so that the axis of the sun shaft 3 and the axis of each planetary shaft 4 are parallel to each other, and each planetary shaft 4 is disposed at regular intervals along the entire circumference of the sun shaft 3. The support with the front collar 51 and the rear collar 52 and the aforementioned mating between the threads and between the gears allows the sun shaft 3 to be positioned so that the axis of the ring shaft 2 and the axis of the sun shaft 3 are aligned with each other.

In this embodiment, the position of the ring shaft 2 at which the axis of the ring shaft 2 is aligned with the axis of the sun shaft 3 as described above is referred to as the aligned position of the ring shaft 2. Also, the position of each planetary shaft 4 at which the axis of each planetary shaft 4 is parallel to the axis of the sun shaft 3 as described above is referred to as the parallel position of planetary shaft 4.

In the conversion mechanism 1, the engagement of the thread and gear of the ring shaft 2 with the thread and gear of each planetary shaft 4 allows for transferring force from one component to the other component between the ring shaft 2 and each planetary shaft 4. Also, the engagement of the thread and gear of the sun shaft 3 with the thread and gear of each planetary shaft 4 allows for transferring force from one component to the other component, i.e., between the sun shaft 3 and each planetary shaft 4.

When one component, i.e., either the ring shaft 2 or the sun shaft 3 rotates, each planetary shaft 4 performs a planetary motion through the transfer of force from that component to each planetary shaft 4. That is, while rotating about its own axis, the planetary shaft 4 rotates about the axis of the sun shaft 3. Such a planetary motion of each planetary shaft 4 further allows for transferring force from each planetary shaft 4 to the other component, i.e., either the ring shaft 2 or the sun shaft 3. In this situation, preventing displacement of the other component in its rotational direction would cause the other component to move axially relative to each planetary shaft 4 through the aforementioned transfer of force.

Thus, the conversion mechanism 1 can convert the rotational motion of one of the ring shaft 2 and the sun shaft 3 to the linear motion of the other. The conversion mechanism 1 may provide either the sun shaft displacement system in which the rotational motion of the ring shaft 2 causes the linear motion of the sun shaft 3, or the ring shaft displacement system in which the rotational motion of the sun shaft 3 causes the linear motion of the ring shaft 2. That is, preventing displacement of the sun shaft 3 in its rotational direction would allow the conversion mechanism to provide the sun shaft displacement system, whereas preventing displacement of the ring shaft 2 in its rotational direction would allow the conversion mechanism to provide the ring shaft displacement system.

Now, by way of example, the conversion mechanism 1 which employs the sun shaft displacement system will be described. In this case, the forward rotational motion of the ring shaft 2 causes the sun shaft 3 to move axially so as to be pushed out of the ring shaft 2, whereas the reverse rotational motion of the ring shaft 2 causes the sun shaft 3 to move axially so as to be pulled into the ring shaft 2. In FIG. 1, a frontward direction FR is a direction in which the sun shaft 3 is pushed out of the ring shaft 2 and a rearward direction RR is a direction in which the sun shaft 3 is pulled into the ring shaft 2

Now, the structure of the ring shaft 2, the structure of the sun shaft 3, and the structure of planetary shaft 4 are described in detail.

The Structure of the Ring Shaft 2

Figure 2A:
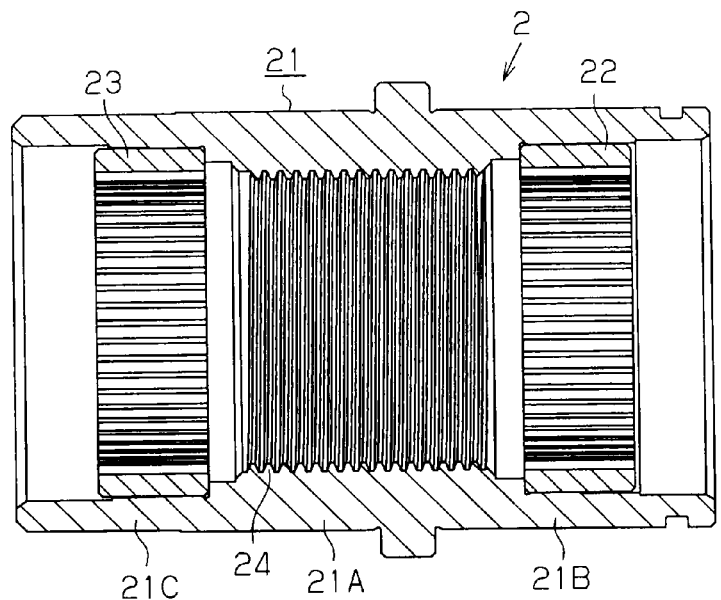
FIG. 2A is a cross-sectional view illustrating the cross-sectional structure of a ring shaft of the conversion mechanism, taken along the center line of the ring shaft.

As illustrated in FIG. 2A, the ring shaft 2 has a pipe-shaped ring shaft body 21, a front ring gear 22 provided on the inner circumferential surface of the front portion of the ring shaft body 21 (the right portion in the figure), and a rear ring gear 23 provided on the inner circumferential surface of the rear portion of the ring shaft body 21 (the left portion in the figure).

The center line or the axis of the ring shaft body 21 is the same as the axis of the ring shaft 2. Thus, aligning the center line of the ring shaft body 21 with the axis of the sun shaft 3 (FIG. 1) can ensure the aligned position of the ring shaft 2. A body thread portion 21A having a female thread 24 is provided with the inner circumferential surface of the longitudinal center portion of the ring shaft body 21.

Figure 2B:
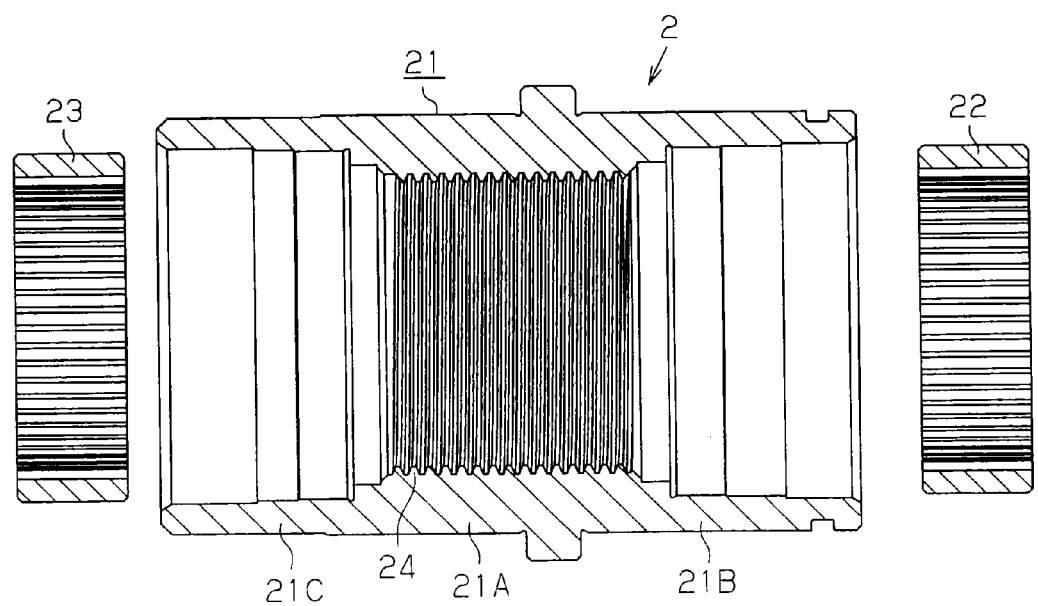
FIG. 2B is a cross-sectional view illustrating the ring shaft when disassembled.

As illustrated in FIG. 2B, the front ring gear 22 and the rear ring gear 23 are separate from the ring shaft body 21. The front ring gear 22 and the rear ring gear 23 are annular internal spur gears, both of which are formed in the same shape, and have the same specifications (such as the reference pitch circle diameter and the number of teeth).

As illustrated in FIG. 2A, the front ring gear 22 is secured by press fit onto the inner circumferential surface of a body gear portion 21B, which is a front portion of the ring shaft body 21. The rear ring gear 23 is secured by press fit onto the inner circumferential surface of a body gear portion 21C, which is a rear portion of the ring shaft body 21. The ring gears 22 and 23 can also be secured to the body gear portions 21B and 21C by a method other than by press fit.

When the front ring gear 22 and the rear ring gear 23 are fitted in the ring shaft body 21 in this manner, the center line of the front ring gear 22 and the rear ring gear 23 is aligned with the center line of the ring shaft body 21. That is, the shape of the outer circumferential surface of the ring gears 22 and 23 as well as the shape of the inner circumferential surface of the body gear portions 21B and 21C are predetermined so that the center line of the front ring gear 22 and the rear ring gear 23 is aligned with the center line of the ring shaft body 21 when the fitting of the front ring gear 22 and the rear ring gear 23 into the ring shaft body 21 is completed.

The Structure of the Sun Shaft 3

Figure 3:
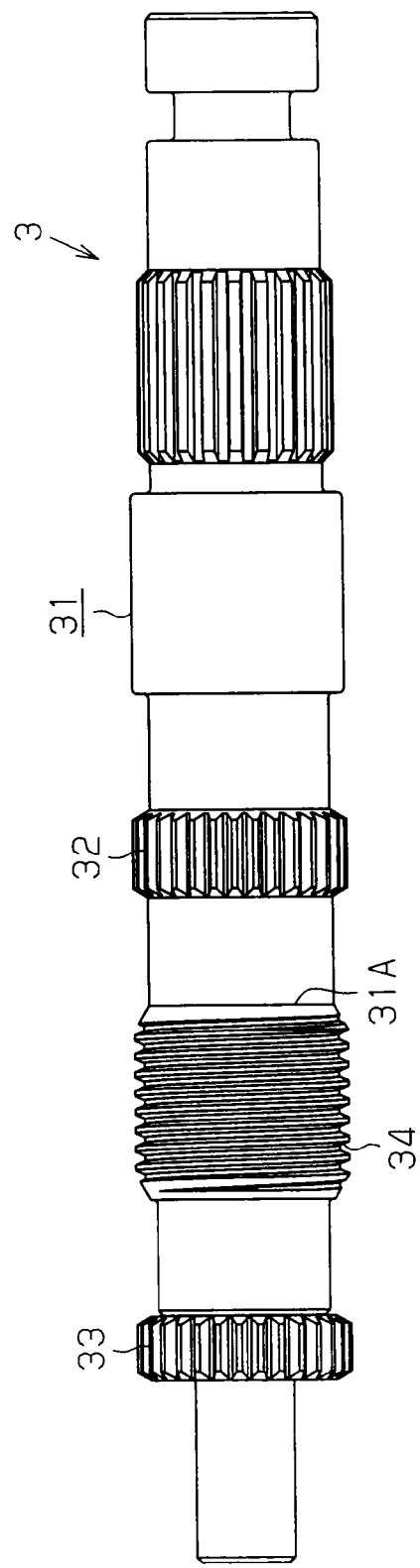
FIG. 3 is a side view illustrating a sun shaft of the conversion mechanism.

As illustrated in FIG. 3, the sun shaft 3 includes a sun shaft body 31 having a body thread portion 31A with a male thread 34 on its outer circumferential surface. On the outer circumferential surface of the sun shaft body 31, a front sun gear 32 is provided on the front side (the right side in the figure) of the body thread portion 31A, while a rear sun gear 33 is provided on the rear side (the left side in the figure) of the body thread portion 31A.

The front sun gear 32 and the rear sun gear 33 are external spur gears, both of which are formed in the same shape, integrated with the ring shaft body 21, and have the same specifications (such as the reference pitch circle diameter and the number of teeth). The center line of the front sun gear 32 and the rear sun gear 33 is aligned with the axis of the sun shaft body 31 (the sun shaft 3).

The Structure of the Planetary Shaft 4

As illustrated in FIG. 4A, the planetary shaft 4 includes a planetary shaft body 41 having a body thread portion 41A with a male thread 44 on its outer circumferential surface.

Since the axis of the planetary shaft body 41 is the same as the axis of the planetary shaft 4, making the axis of the planetary shaft body 41 parallel to the axis of the sun shaft 3 (FIG. 1) would assure the parallel position of the planetary shaft 4. In the planetary shaft body 41, a front planetary gear 42 is provided on the front side (the right side in the figure) of the body thread portion 41A while a rear planetary gear 43 is provided on the rear side (the left side in the figure) of the body thread portion 41A. The front planetary gear 42 and the rear planetary gear 43 are external spur gears, both of which are formed in the same shape, and have the same specifications (such as the reference pitch circle diameter and the number of teeth).

To align the center line of the front planetary gear 42 with the axis of the planetary shaft body 41, the front planetary gear 42 is integrated with a front shaft 41F, which is a front portion of the planetary shaft body 41.

As illustrated in FIG. 4B, the rear planetary gear 43 is separate from the planetary shaft body 41. As illustrated in FIG. 4C, a bearing hole 43H is formed inside the rear planetary gear 43 to extend along the center line of the gear 43. A rear shaft 41R, or a rear portion of the planetary shaft body 41, is inserted into the bearing hole 43H, thereby allowing the rear planetary gear 43 to be attached to the planetary shaft body 41.

By way of example, the rear planetary gear 43 is attached to the planetary shaft body 41 by running fit so that the rear planetary gear 43 can rotate relative to the planetary shaft body 41. When assembled, the center line of the rear planetary gear 43 is aligned with the axis of the planetary shaft body 41. That is, the shape of the inner circumferential surface of the bearing hole 43H and the shape of the outer circumferential surface of the rear shaft 41R are predetermined so that the center line of the rear planetary gear 43 is aligned with the center line of the planetary shaft body 41 when the fitting is completed.

Now, referring to FIGS. 5 to 8, description will be made to the relation between each component of the conversion mechanism 1 such as the ring shaft 2, the sun shaft 3, and the planetary shaft 4, and to the operation of the conversion mechanism 1.

Figure 5:
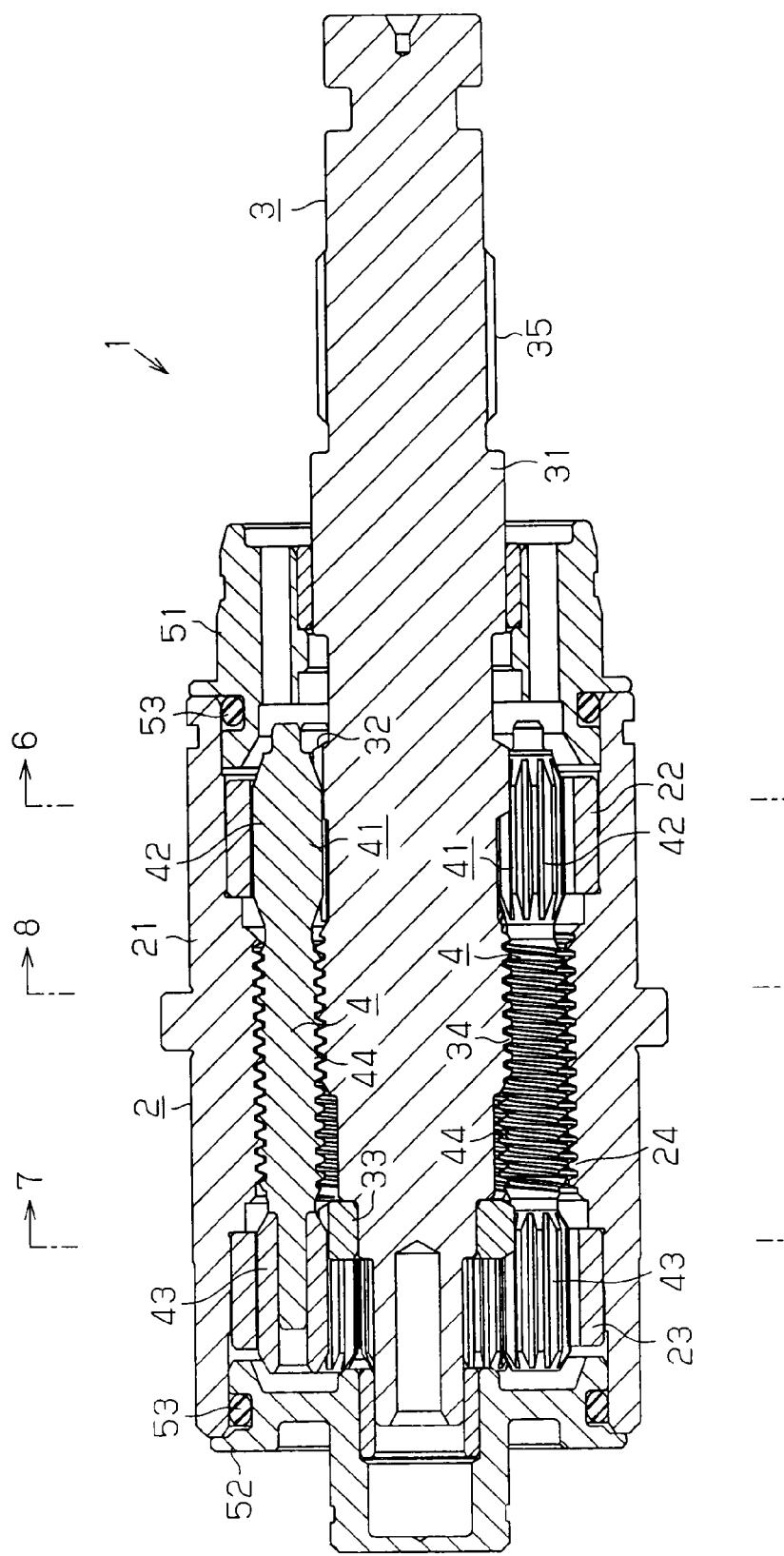
FIG. 5 is a cross-sectional view illustrating the cross-sectional structure of conversion mechanism, taken along its center line.
Figure 6:
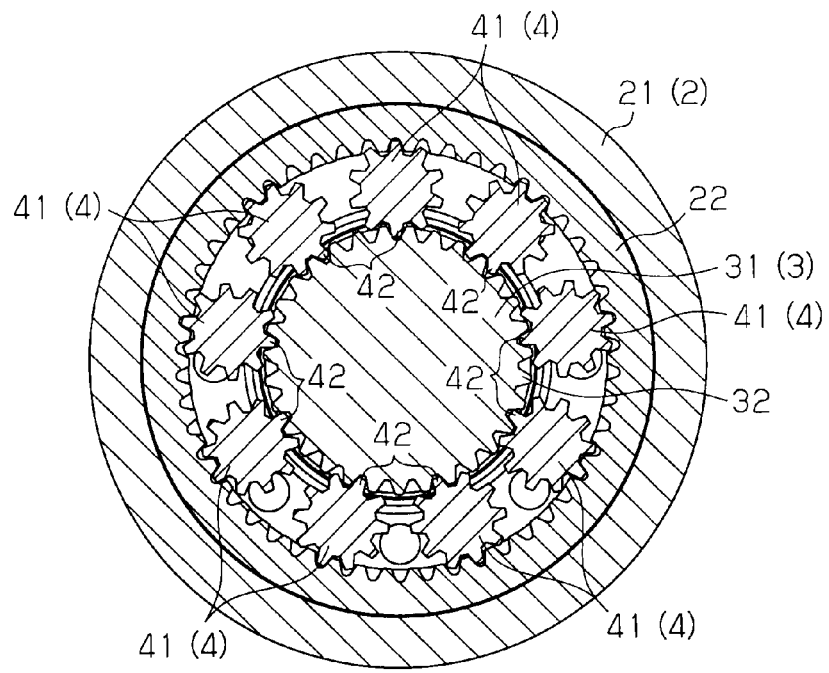
FIG. 6 is a cross-sectional view illustrating the cross-sectional structure of the conversion mechanism, taken along line 6-6 of FIG. 5.
Figure 7:
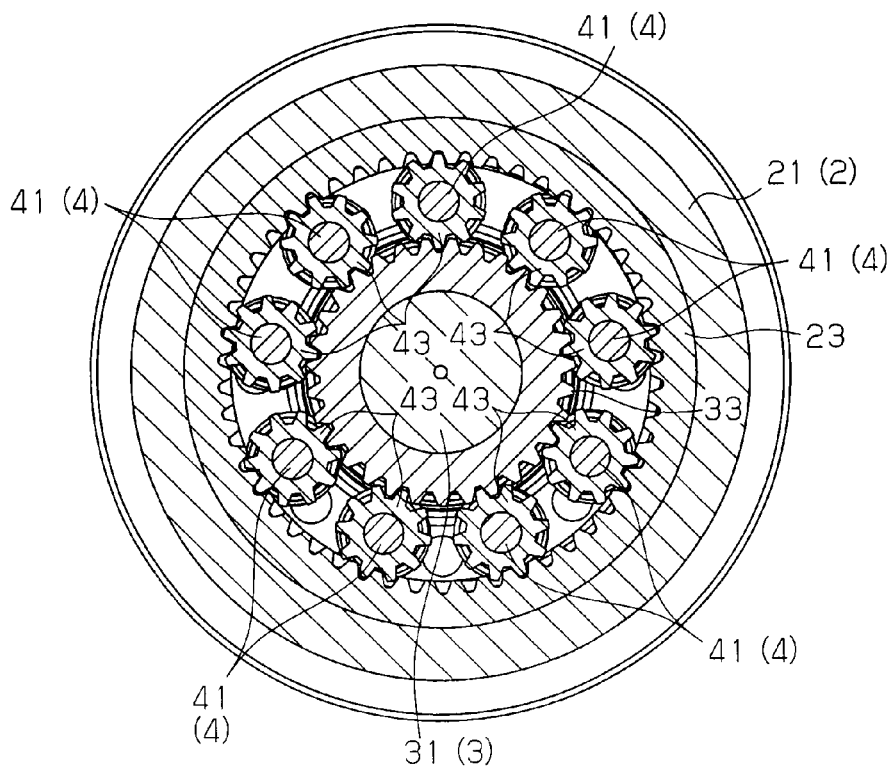
FIG. 7 is a cross-sectional view illustrating the cross-sectional structure of the conversion mechanism, taken along line 7-7 of FIG. 5.
Figure 8:
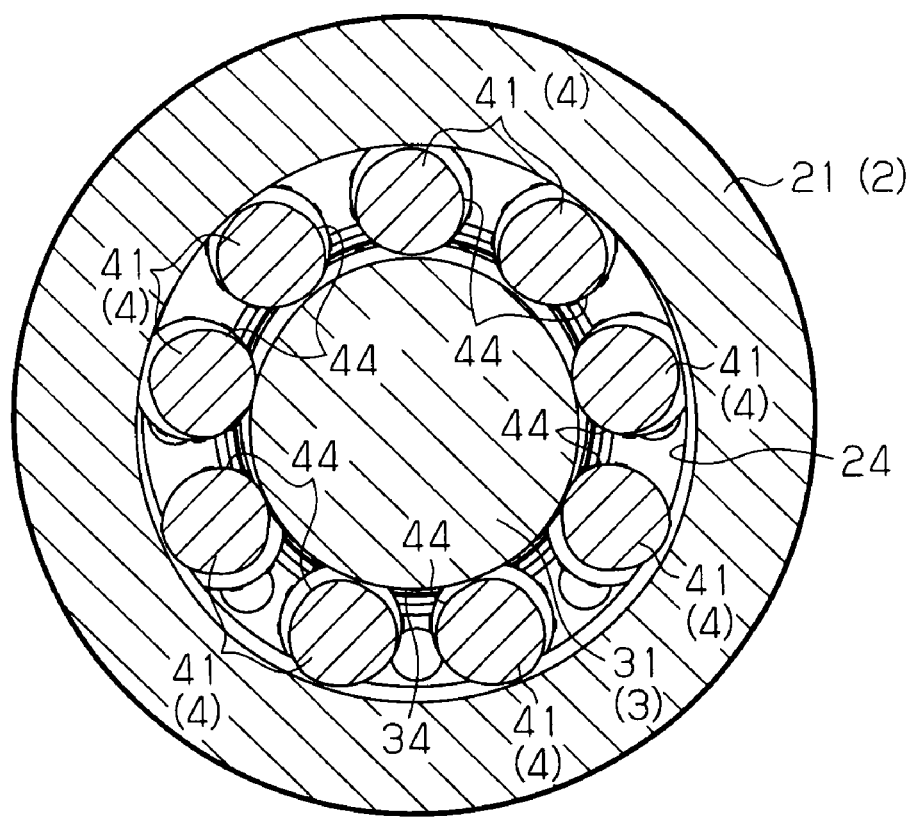
FIG. 8 is a cross-sectional view illustrating the cross-sectional structure of the conversion mechanism, taken along line 8-8 of FIG. 5.

Of these figures, FIG. 5 illustrates the cross-sectional structure of the conversion mechanism 1 along the center line of the sun shaft 3. FIG. 6 illustrates the cross-sectional structure of the conversion mechanism 1 taken along line 6-6 of FIG. 5. FIG. 7 illustrates the cross-sectional structure of the conversion mechanism 1 taken along line 7-7 of FIG. 5. FIG. 8 illustrates the cross-sectional structure of the conversion mechanism 1 taken along line 8-8 of FIG. 5. Note that the conversion mechanism 1 having nine planetary shafts 4 is illustrated here by way of example; however, the number of planetary shafts 4 employed can be changed as appropriate.

As illustrated in FIG. 5, the ring shaft 2, each of the planetary shafts 4, and the sun shaft 3 are joined together through the mating between their threads and between their gears. More specifically, the female thread 24, the front ring gear 22, and the rear ring gear 23 of the ring shaft 2 are mated with the male thread 44, the front planetary gear 42, and the rear planetary gear 43 of each planetary shaft 4, respectively. The male thread 44, the front planetary gear 42, and the rear planetary gear 43 of each planetary shaft 4 are also mated with the female thread 34, the front sun gear 32, and the rear sun gear 33 of the sun shaft 3, respectively. These engagements between the threads and between the gears allow the ring shaft 2 and each planetary shaft 4 to mate with each other as well as each planetary shaft 4 and the sun shaft 3 to mate with each other.

FIG. 6 shows the front ring gear 22 of the ring shaft 2, the front planetary gear 42 of each planetary shaft 4, and the front sun gear 32 of the sun shaft 3, which are mated together. As illustrated, the front ring gear 22 is fixed to the ring shaft body 21, the front planetary gear 42 is integrated with the planetary shaft body 41, and the front sun gear 32 is integrated with the sun shaft body 31.

FIG. 7 shows the rear ring gear 23 of the ring shaft 2, the rear planetary gear 43 of each planetary shaft 4, and the rear sun gear 33 of the sun shaft 3, which are mated together. As illustrated, the rear ring gear 23 is fixed to the ring shaft body 21, the rear planetary gear 43 is rotatable about its axis relative to the planetary shaft body 41, and the rear sun gear 33 is integrated with the sun shaft body 31.

FIG. 8 also illustrates the female thread 24 of the ring shaft 2, the male thread 44 of each planetary shaft 4, and the male thread 34 of the sun shaft 3, which are mated together. As illustrated, the female thread 24 is integrated with the ring shaft body 21, and the male thread 44 is integrated with the planetary shaft body 41, and the male thread 34 is integrated with the sun shaft body 31.

Accordingly, in FIG. 5, a rotational motion imparted to the ring shaft 2 would cause the front ring gear 22 to mate with each front planetary gear 42, the rear ring gear 23 to mate with each rear planetary gear 43, and the female thread 24 to mate with each male thread 44. This allows the rotating ring shaft 2 to transfer force to each planetary shaft 4. This transfer of force produces a planetary motion of each planetary shaft 4 so as to rotate about the axis of the sun shaft 3 while rotating about its own axis. Furthermore, such a planetary motion of each planetary shaft 4 causes each front planetary gear 42 to mate with the front sun gear 32, each rear planetary gear 43 to mate with the rear sun gear 33, and each male thread 44 to mate with the male thread 34. This allows each planetary shaft 4, which is making a planetary motion, to transfer force to the sun shaft 3. In this situation, preventing displacement of the sun shaft 3 in its rotational direction allows the sun shaft 3 to be axially displaced through the aforementioned transfer of force.

For example, displacement of the sun shaft 3 in its rotational direction may be prevented as follows. That is, straight splines 35 which extend in the axial direction of the sun shaft 3 may be provided on the outer circumferential surface of a portion of the sun shaft 3 protruding from the ring shaft 2 and corresponding straight splines (not illustrated) which mate with the straight splines 35 are provided on at a place where the conversion mechanism 1 is installed. In this case, the mating of the straight splines 35 of the sun shaft 3 with the non-illustrated straight splines prepared at the place can prevent the sun shaft 3 from being displaced in its rotational direction, while permitting the shaft 3 to be displaced in its axial direction.

Now, referring to FIGS. 9 to 23, a method for fabricating the rotational-to-linear motion conversion mechanism 1 is described. In the fabricating method according to this embodiment, the steps A to J as described below are performed to fabricate the conversion mechanism 1.

Step A

Figure 9:
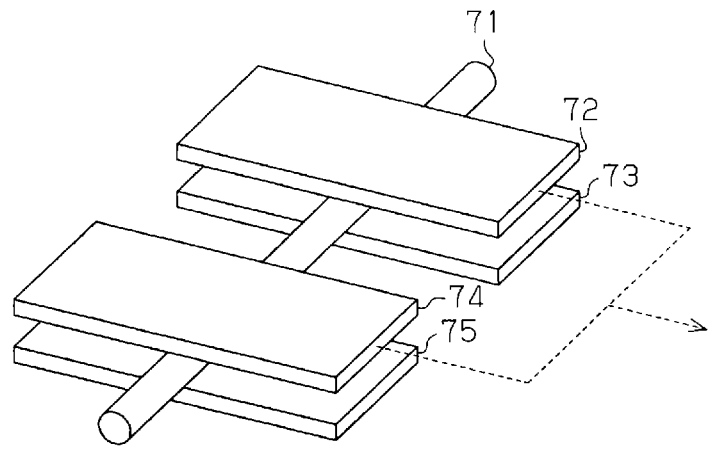
FIG. 9 is a schematic perspective view illustrating the process in step A of a method for fabricating the conversion mechanism.

The front sun gear 32 and the rear sun gear 33 are integrated with the sun shaft 3 by rolling so that both of the gears are in phase around the axis of the sun shaft 3. More specifically, as illustrated in FIG. 9, a round-rod shaped raw workpiece 71 for making the sun shaft 3 (the sun shaft body 31) is sandwiched between a pair of rolling dies 72 and 73 used for forming the front sun gear 32 and is also sandwiched between a pair of rolling dies 74 and 75 used for forming the rear sun gear 33. With this arrangement, the rolling dies 72 and 73 and the rolling dies 74 and 75 are aligned in the radial direction of the raw workpiece 71 (in the right to left direction in the figure). The opposing faces of the rolling dies 72 and 73 are shaped corresponding to the outer circumferential surface of the front sun gear 32 whereas the opposing faces of the rolling dies 74 and 75 are shaped corresponding to the outer circumferential surface of the rear sun gear 33. One of the rolling dies 72 and 73 (the rolling die 72 in this example) and one of the rolling dies 74 and 75 (the rolling die 74 in this example) are moved at the same time relative to the other rolling dies (the rolling dies 73 and 75 in this example) in the radial direction of the raw workpiece 71 as illustrated by the dashed arrow. The front sun gear 32 and the rear sun gear 33 are thereby formed on the raw workpiece 71. The front sun gear 32 and the rear sun gear 33 formed by the rolling are in phase around the axis of the raw workpiece 71.

Figure 10:
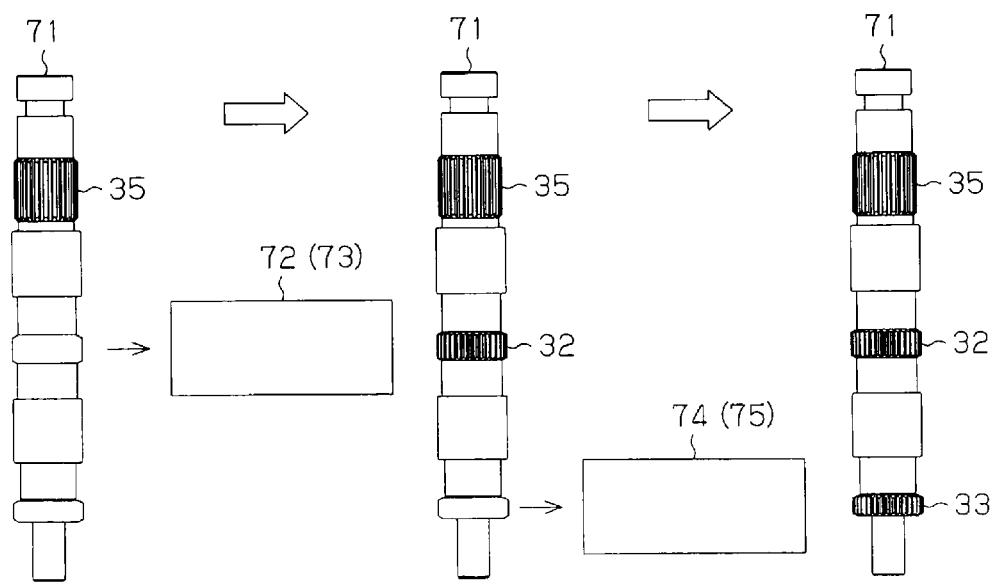
FIG. 10 is an schematic view illustrating another example of step A.

Instead, to form the front sun gear 32 and the rear sun gear 33 on the raw workpiece 71 by rolling, for example, the following method can also be employed. As illustrated in FIG. 10, the straight splines 35 may be formed on the raw workpiece 71 in advance, and then the front sun gear 32 is formed using the rolling dies 72 and 73 which are positioned with respect to the splines 35. Thereafter, the rear sun gear 33 is formed using the rolling dies 74 and 75 which are positioned with respect to the splines 35 in the same manner. The front sun gear 32 and the rear sun gear 33 prepared as such have been formed using the rolling dies 72 to 75 which are positioned with respect to the straight splines 35, and are thus also in phase around the axis of the raw workpiece 71.

Step B

Figure 11:
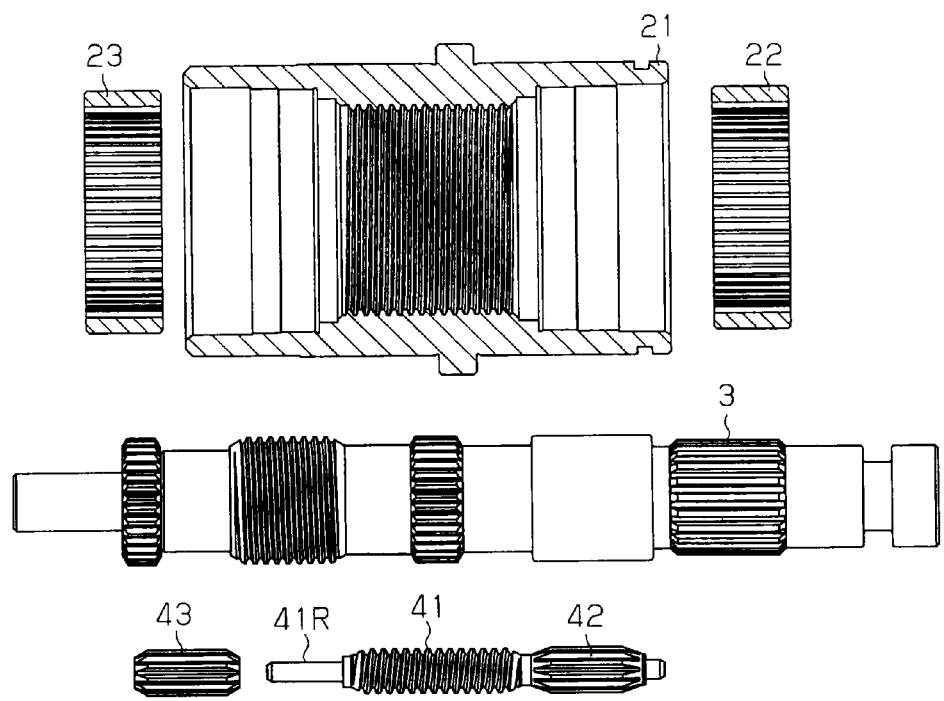
FIG. 11 is a view illustrating the process in step B of the method for fabricating the conversion mechanism.

Each component of the conversion mechanism 1, i.e., the ring shaft body 21, the sun shaft 3, the planetary shaft body 41, the front ring gear 22, the rear ring gear 23, and the rear planetary gear 43, which are illustrated in FIG. 11, are washed.

Step C

A plurality of planetary shaft bodies 41 (nine in this embodiment) are disposed around the sun shaft 3 at regular or equal intervals (40 degrees in this embodiment) along the circumference of the sun shaft 3.

Figure 12:
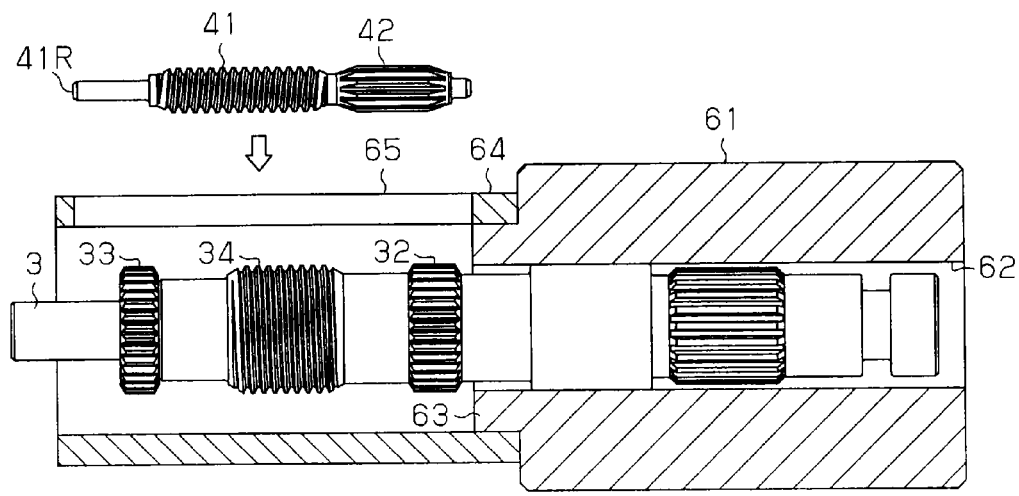
FIG. 12 is a view illustrating the process in step C of the method for fabricating the conversion mechanism.

More specifically, as illustrated in FIG. 12, to begin with, the sun shaft 3 is inserted into a through hole 62 of a base jig 61, leaving the front sun gear 32, the male thread 34, and the rear sun gear 33 of the sun shaft 3 exposed out of the through hole 62. An annular holder portion 63 surrounding the opening portion of the through hole 62 is provided on an end face of the rear side (the left side in the figure) of the base jig 61. The inner diameter of the holder portion 63 is set to the value equal to the outer diameter of the front sun gear 32, the male thread 34, and the rear sun gear 33 of the sun shaft 3. Additionally, the radial thickness of the holder portion 63 is set to the value equal to the outer diameter of the male thread 44 and the front planetary gear 42 of the planetary shaft body 41.

The inner circumferential surface of the front portion (the right side in the figure) of a pipe-shaped ring jig 64 is fitted over the outer circumferential surface of the holder portion 63 of the base jig 61. The inner diameter of the ring jig 64 is set to the value equal to the inner diameter of a portion of the ring shaft body 21 where the female thread 24 is formed. Above the sun shaft 3, a slit 65 which is longer than the distance from the front sun gear 32 to the rear sun gear 33 is formed and extends along the center line of the ring jig 64.

In this arrangement, the planetary shaft body 41 is received from above the slit 65 of the ring jig 64 toward the sun shaft 3 via the slit 65, so that the male thread 44 and the front planetary gear 42 of the planetary shaft body 41 are mated with the male thread 34 and the front sun gear 32 of the sun shaft 3, respectively. After that, the sun shaft 3 is rotated by 40 degrees about its axis, thereby allowing the planetary shaft body 41 to be rotationally displaced by 40 degrees around the axis of the sun shaft 3.

The above steps are repeated as many times as the number of the planetary shaft bodies 41, thereby allowing the plurality of planetary shaft bodies 41 to be disposed around the sun shaft 3 at regular intervals (40 degrees) along the circumference of the shaft 3. Each planetary shaft body 41 is sandwiched and held between the sun shaft 3 and the ring jig 64. When all the planetary shaft bodies 41 have been arranged in place around the sun shaft 3 in this manner, the base jig 61 is extracted toward the front side (the right side in the figure) relative to the sun shaft 3, and accordingly, the outer circumferential surface of the holder portion 63 is extracted from the inner circumferential surface of the front end portion of the ring jig 64.

Step D

Figure 13:
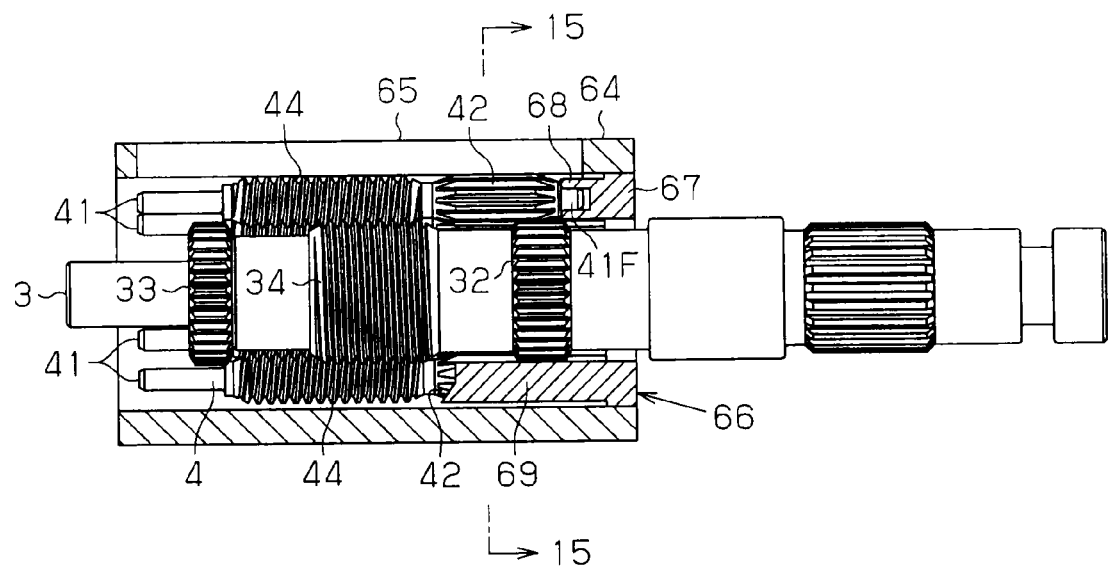
FIG. 13 is a view illustrating the process in step D of the method for fabricating the conversion mechanism.

As illustrated in FIG. 13, a retainer jig 66 is attached from the front side (the right side in the figure) to each planetary shaft body 41 placed around the sun shaft 3, thereby allowing each planetary shaft body 41 to be held in parallel to the sun shaft 3.

Now, the structure of the retainer jig 66 is described.

The retainer jig 66 includes a ring-shaped bases portion 67, and shaft holder portions 68 and fork portions 69 which extend from the base 67 toward the center line of the base portion 67. The base portion 67 has such an inner diameter as to receive the sun shaft 3 therein and such an outer diameter as to be inserted into the ring jig 64. The shaft holder portions 68 and the fork portions 69 extend from the rear surface (the left surface in the figure) of the base portion 67 in parallel to the planetary shaft 4. The shaft holder portions 68 and the fork portions 69 are illustrated in FIG. 14 when viewed from the rear side.

Figure 14:
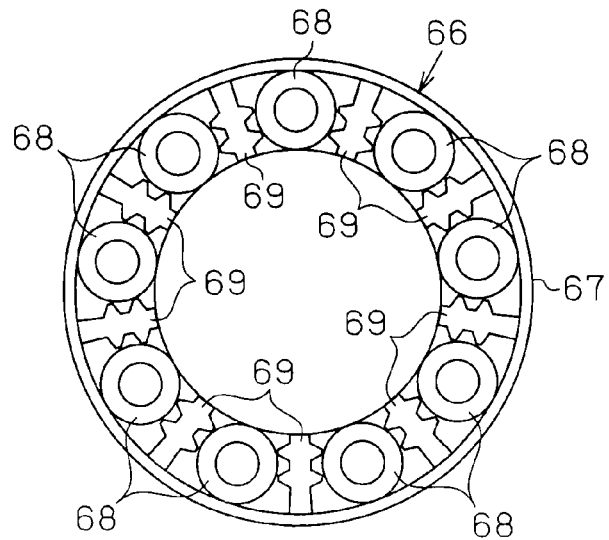
FIG. 14 is a front view illustrating a retainer jig used in step D.

As illustrated in FIG. 14, the shaft holder portions 68 are disposed at regular intervals along the circumference of the base portion 67 corresponding in number to the planetary shaft bodies 41 (FIG. 13). Each fork portion 69 is disposed between the two shaft holder portions 68. With the shaft holder portions 68 and the fork portions 69 oriented toward the planetary shaft body 41 and each shaft holder portion 68 aligned to oppose the front shaft 41F of the planetary shaft body 41, the base portion 67 is inserted into the inner circumferential surface of the front end portion of the ring jig 64, as illustrated in FIG. 13. As such, the front shaft 41F of the planetary shaft body 41 is inserted into the shaft holder portion 68, and the fork portion 69 is inserted in between the adjacent front planetary gears 42 of the planetary shaft bodies 41 in contact with the entire length of the gear 42.

Figure 15:
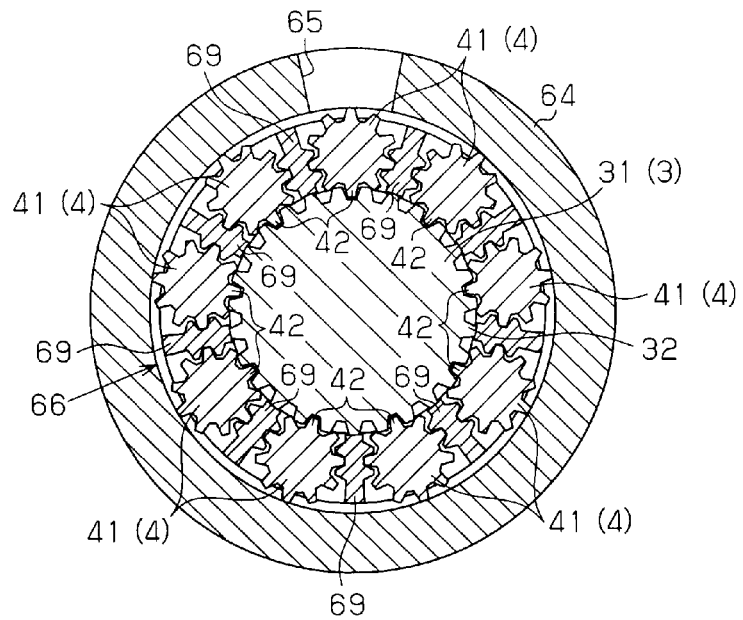
FIG. 15 is a cross-sectional view illustrating the ring shaft body, the planetary shaft body, the sun shaft, and the retainer jig of FIG. 13, when viewed from the direction of arrows 15-15.

FIG. 15 is a cross-sectional view of the sun shaft 3, the planetary shaft body 41, the ring jig 64, and the retainer jig 66 of FIG. 13, when viewed from the direction of arrows 15-15 and illustrates the fork portions 69 inserted in between the respective two front planetary gears 42 with the retainer jig 66 attached to the planetary shaft body 41. As illustrated in FIG. 15, the cross section of the fork portions 69 are shaped so as to mate with each of the adjacent front planetary gears 42. Such a contact of each fork portion 69 with the front planetary gears 42 allows each planetary shaft body 41 placed around the sun shaft 3 in a parallel position and prevents each planetary shaft body 41 from rotating about its own axis.

Step E

While the ring shaft body 21 is being attached to each planetary shaft body 41 placed around the sun shaft 3, the ring jig 64 is removed from each planetary shaft body 41.

Figure 16:
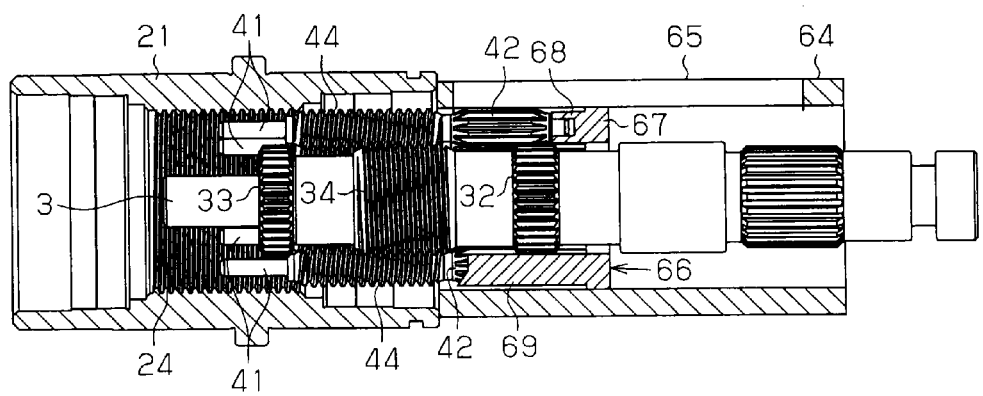
FIG. 16 is a view illustrating the process in step E of the method for fabricating the conversion mechanism.

More specifically, as illustrated in FIG. 16, the rear side end (the left side in the figure) of the ring jig 64 is pushed with the front side end (the right side in the figure) of the ring shaft body 21, thereby moving the ring shaft body 21 toward the front side until the female thread 24 of the ring shaft body 21 is brought into contact with the male thread 44 of each planetary shaft body 41. After that, while rotation of each planetary shaft body 41 and the retainer jig 66 around the axis of the sun shaft 3 is prevented, the ring shaft body 21 is rotated around the aforementioned axis to be screwed toward the front side, thereby allowing the female thread 24 of the ring shaft body 21 to mate with the male thread 44 of each planetary shaft body 41. This causes the ring shaft body 21 to be attached to each planetary shaft body 41 and aligned with the sun shaft 3. Then the ring jig 64 is pushed with the ring shaft body 21 toward the front side and removed from each planetary shaft body 41.

When the ring shaft body 21 is screwed over each planetary shaft body 41, a frictional force is generated and acts on each planetary shaft body 41 so as to tilt it with respect to the axis of the sun shaft 3. However, inclination of each planetary shaft body 41 with respect to the axis of the sun shaft 3 is prevented by the fork portions 69 (the retainer jig 66) located near the male thread 44, which is a portion on which the aforementioned force acts. Thus, the parallel position of the planetary shaft bodies 41 is not affected by the aforementioned force.

Step F

Figure 17:
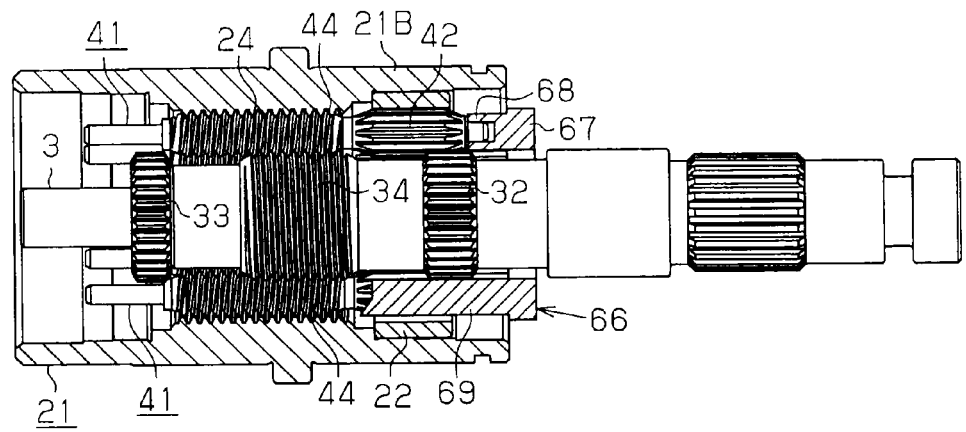
FIG. 17 is a view illustrating the process in step F of the method for fabricating the conversion mechanism.

The front ring gear 22 is fitted into the ring shaft body 21 from the front side of the ring shaft body 21. As a result, as illustrated in FIG. 17, the front ring gear 22 is secured to a front portion of the ring shaft body 21, or the inner circumferential surface of the body gear portion 21B, and mated with the front planetary gear 42 of the planetary shaft body 41.

Step G

Figure 18:
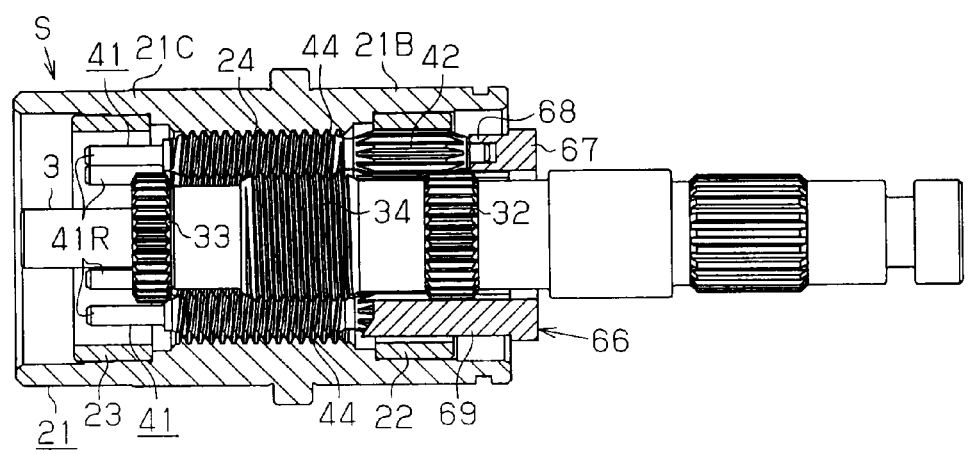
FIG. 18 is a view illustrating the process in step G of the method for fabricating the conversion mechanism.

The rear ring gear 23 is fitted into the ring shaft body 21 from the rear side of the ring shaft body 21. As a result, as illustrated in FIG. 18, the rear ring gear 23 is secured to a rear portion of the ring shaft body 21, or the inner circumferential surface of the body gear portion 21C. In this manner, a subassembly S has been completed. The subassembly S includes the sun shaft 3 having the front sun gear 32 and the rear sun gear 33, the planetary shaft body 41 formed of the front planetary gear 42, the ring shaft body 21, the front ring gear 22, and the rear ring gear 23.

Step H

Figure 19:
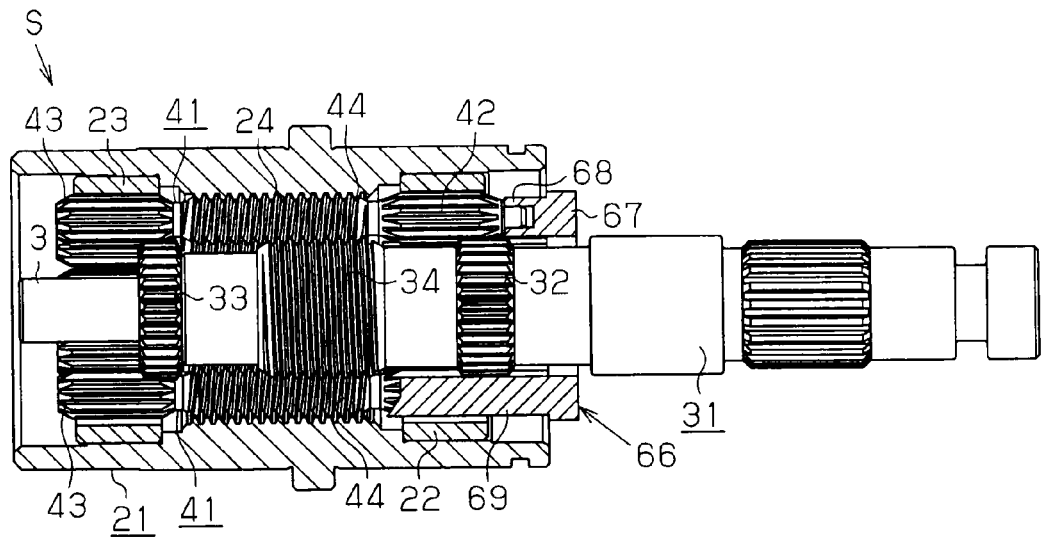
FIG. 19 is a view illustrating the process in step H of the method for fabricating the conversion mechanism.

The rear planetary gear 43 is fitted over the outer circumferential surface of the rear shaft 41R of each planetary shaft body 41 in the subassembly S. This causes the rear shaft 41R to penetrate the bearing hole 43H (FIG. 4C) of the rear planetary gear 43, so that, as illustrated in FIG. 19, the rear planetary gear 43 is attached rotatably to the rear shaft 41R. While being fitted over the rear shaft 41R, the rear planetary gear 43 moves in the axial direction of the shaft 41R to mate with the rear sun gear 33 and the rear ring gear 23.

To smoothly fit the rear planetary gear 43 over the rear shaft 41R, it is preferable that the phases of the front sun gear 32 and the rear sun gear 33 around the axis of the sun shaft 3 be the same and that the phases of the front ring gear 22 and the rear ring gear 23 around the same axis be the same. This is because when the phases of the rear sun gear 33 and the rear ring gear 23 around the axis are the same as those of the front sun gear 32 and the front ring gear 22 both mating with the front planetary gear 42, the rear planetary gear 43 can be readily mated with the gears 32 and 22. When the phases of the rear sun gear 33 and the rear ring gear 23 around the axis are the same as those of the front sun gear 32 and the front ring gear 22, respectively, the relative phase of the rear ring gear 23 around the axis with respect to the rear sun gear 33 should be equal to the relative phase of the front ring gear 22 around the same axis with respect to the front sun gear 32.

Figure 20:
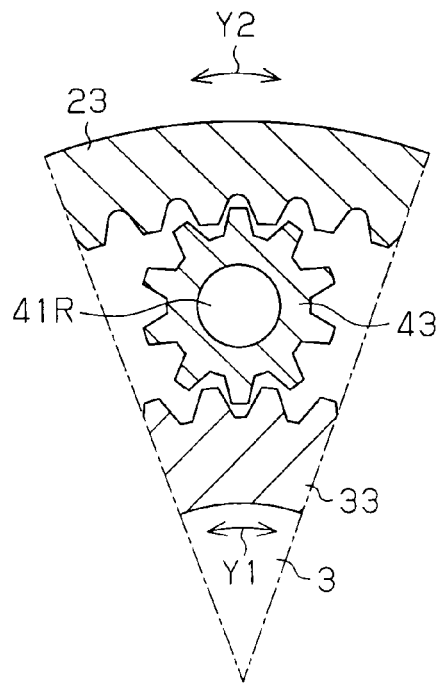
FIG. 20 is an enlarged view illustrating the rear planetary gear mated with a rear ring gear and a rear sun gear.
Figure 21:
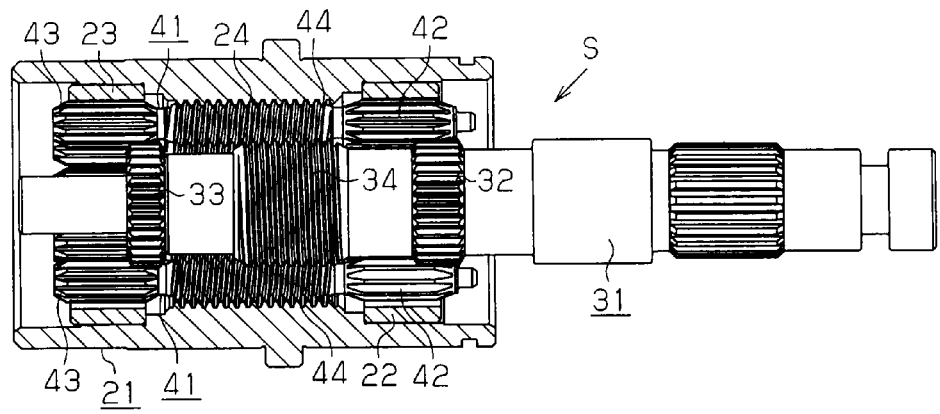
FIG. 21 is a view illustrating the process in step I of the method for fabricating the conversion mechanism.

This embodiment is adapted such that the phase of the front sun gear 32 around the axis of the sun shaft 3, i.e., the phase in the direction of arrow Y1 of FIG. 20 is the same as the phase of the rear sun gear 33 around the same axis through the rolling in step A mentioned above. However, it is possible that the phase of the rear ring gear 23 around the aforementioned axis, i.e., the phase in the direction of arrow Y2 of FIG. 20 differs from the phase of the front ring gear 22 around the same axis when the rear ring gear 23 is installed on the ring shaft body 21 in step G mentioned above. In that case, the relative phase of the rear ring gear 23 around the axis with respect to the rear sun gear 33 may be different from the relative phase of the front ring gear 22 around the same axis with respect to the front sun gear 32.

Even in this situation, the rear planetary gear 43 can be mated with the rear sun gear 33 that has a phase same as that of the front sun gear 32 around the axis. Furthermore, the rear planetary gear 43 can also be mated with the rear ring gear 23 that has a phase different from that of the front ring gear 22 around the axis. This is because the rear planetary gear 43 mated with the rear sun gear 33 can rotate about the axis of the rear shaft 41R by an amount of the backlash therebetween. That is, the relative phase of the rear ring gear 23 around the axis with respect to the rear sun gear 33 may be different from the relative phase of the front ring gear 22 around the axis with respect to the front sun gear 32. Even in this case, the rear planetary gear 43 can be mated with the rear ring gear 23 through the rotation of the rear planetary gear 43 about its own axis within the range of the aforementioned backlash.

Step I

The retainer jig 66 is pulled toward the front side thereby the shaft holder portions 68 of the retainer jig 66 are detached from the planetary shaft bodies 41 as well as the fork portions 69 are extracted from between the adjacent front planetary gears 42. As a result, in the subassembly S illustrated in FIG. 21, the retainer jig 66 (FIG. 19) once attached to the planetary shaft body 41 is removed away.

Step J

Figure 22:
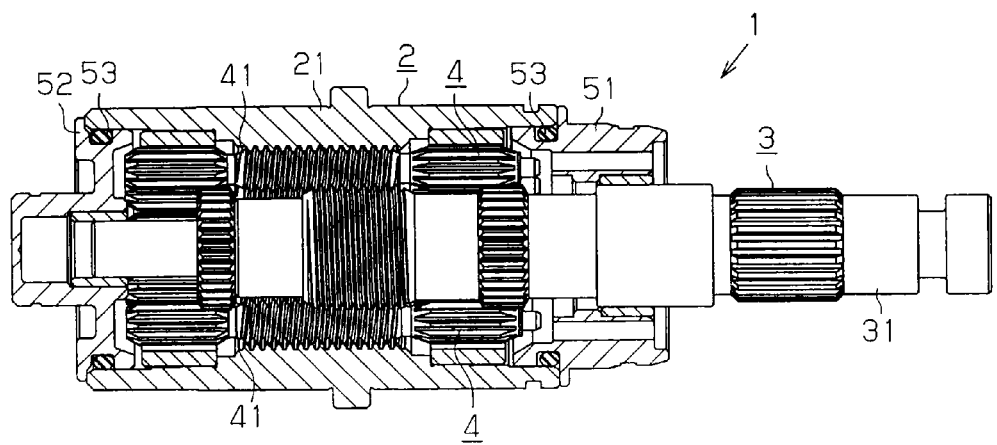
FIG. 22 is a view illustrating the process in step J of the method for fabricating the conversion mechanism.

As illustrated in FIG. 22, the front collar 51 having the O-ring 53 is attached to the inner circumferential surface of the front end portion of the ring shaft body 21, and the rear collar 52 having the O-ring 53 is attached to the inner circumferential surface of the rear end portion of the ring shaft body 21. As such, assembly of the conversion mechanism 1 has been completed.

The above embodiment has the following advantageous effects.

(1) Provided that force acts upon the rear planetary gear 43 in the circumferential direction of the sun shaft 3 when the rear planetary gear 43 is attached to the rear shaft 41R in step H. In that case, even if each fork portion 69 of the retainer jig 66 is inserted between the adjacent front planetary gears 42 of the planetary shaft bodies 41, the rear planetary gear 43 is unavoidably displaced in its circumferential direction. In other words, each fork portion 69 of the retainer jig 66 is in contact only with the front planetary gear 42 of the planetary shaft body 4 and thus, when force acts upon the rear planetary gear 43 in the circumferential direction of the sun shaft 3, the point on which the force is exerted is apart from the fork portion 69. It is therefore difficult for the fork portions 69 to prevent displacement of the rear planetary gear 43 in the circumferential direction of the sun shaft 3 due to the applied force. A displacement of the rear planetary gear 43 in the circumferential direction of the sun shaft 3 relative to the front planetary gear 42 would cause the planetary shaft body 41 to be tilted with respect to the sun shaft 3, thereby losing the parallel position of the planetary shaft body 41.

Figure 23:
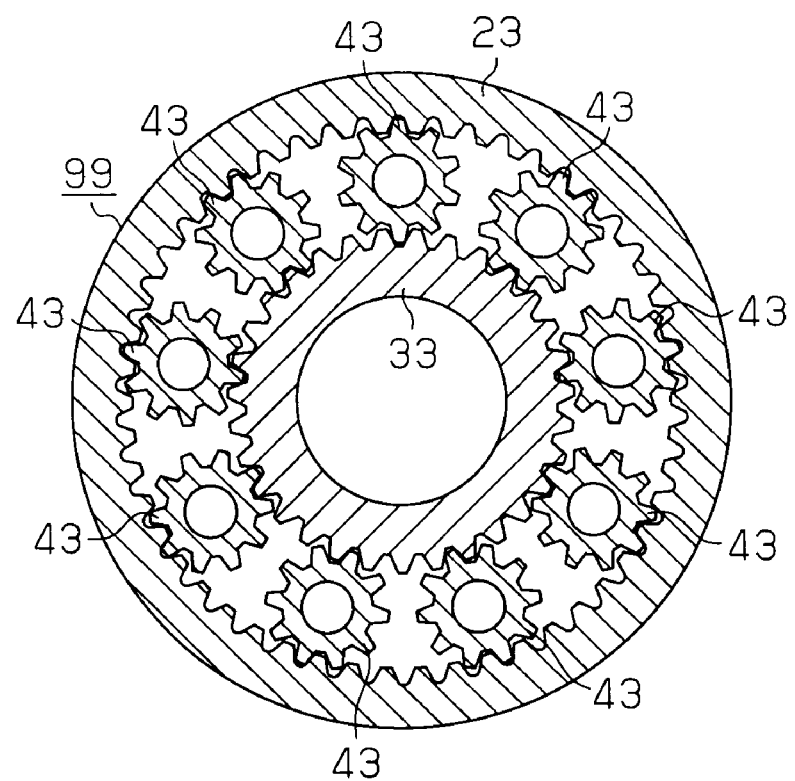
FIG. 23 is a cross-sectional view illustrating a gear assembly made up of the rear sun gear, the rear ring gear, and the rear planetary gear.

For example, when the rear planetary gear 43 is attached to the rear shaft 41R, force acts on the rear planetary gear 43 in the circumferential direction of the sun shaft 3 as follows. The rear sun gear 33, separate from the sun shaft body 31, the rear ring gear 23, and the rear planetary gear 43 are assembled into a gear assembly 99 as illustrated in FIG. 23. The gear assembly 99 is attached to the sun shaft body 31, the ring shaft body 21, and each planetary shaft body 41. When the gear assembly 99 is attached, the rear sun gear 33 is fitted over the outer circumferential surface of the sun shaft body 31, the rear ring gear 23 is fitted into the inner circumferential surface of the ring shaft body 21, and each rear planetary gear 43 is fitted over the planetary shaft body 41, i.e., the outer circumferential surface of the rear shaft 41R, at the same time. In this situation, there may be a difference in out-of-roundness between the inner circumferential surface of the rear sun gear 33 and the outer circumferential surface of the sun shaft body 31 as well as a difference in out-of-roundness between the outer circumferential surface of the rear ring gear 23 and the inner circumferential surface of the ring shaft body 21. These differences may cause the entire gear assembly 99 to be twisted in the circumferential direction of the sun shaft body 31. This would cause force to act on the rear planetary gear 43 in the circumferential direction of the sun shaft 3, resulting in displacement of the rear planetary gear 43 in the circumferential direction.

However, in the above step H, only the rear planetary gear 43 is fitted over the outer circumferential surface of the rear shaft 41R. While rotating about the axis of the rear shaft 41R as appropriate, the rear planetary gear 43 moves in the direction of the axis to only mate with the rear sun gear 33 and the rear ring gear 23. Accordingly, when the rear planetary gear 43 is fitted over the rear shaft 41R, no force acts on the rear planetary gear 43 in the circumferential direction of the sun shaft 3, and thus the rear planetary gear 43 will not be displaced in the circumferential direction of the sun shaft 3 due to the force that would otherwise act thereon. Thus, upon installation of the rear planetary gear 43, the gear 43 does not displace relative to the front planetary gear 42 in the circumferential direction of the sun shaft 3. It is thus possible to avoid the inclination of the planetary shaft 4 with respect to the sun shaft 3, thereby preventing fabrication of the conversion mechanism 1 with the planetary shaft 4 tilted.

(2) To stabilize the rotational motion of each planetary shaft 4 about its own axis and the sun shaft 3 when the conversion mechanism 1 is actuated, it is preferable to eliminate the phase shift between the front sun gear 32 and the rear sun gear 33 around the axis of the sun shaft 3. This is because the elimination of the phase shift and thus elimination of the difference between the front sun gear 32 and the rear sun gear 33 in the timing at which force is transferred between the planetary shaft 4 and the sun shaft 3 enables a smooth rotational motion of the planetary shaft 4 about its own axis and the sun shaft 3. Here, the front sun gear 32 and the rear sun gear 33 may be formed on the sun shaft body 31 by the rolling of step A. This makes it possible to readily form the sun shaft 3 including the front sun gear 32 and the rear sun gear 33 being in phase around the axis of the sun shaft 3.

(3) Upon preparing the subassembly S in steps E to G, each planetary shaft body 41 arranged around the sun shaft 3 is held precisely in parallel to the sun shaft 3 with the retainer jig 66. Accordingly, upon preparation of the subassembly S, the use of the retainer jig 66 may prevent the inclination of the planetary shaft body 41 with respect to the sun shaft 3.

The above embodiment can be changed as follows.

The rear sun gear 33 may be separate from the sun shaft body 31 so that the rear sun gear 33 is fixedly attached to the sun shaft body 31 in step G. This also provides the sane effect as in (1) of the above embodiment.

However, in this case, the fixed rear sun gear 33 may have a phase different from that of the front sun gear 32 in the axial direction of the sun shaft 3. Depending on the phases of the front ring gear 22 and the rear ring gear 23 around the axis, the relative phase of the rear ring gear 23 and that of the front ring gear 22 around the axis with respect to the rear sun gear 33 become different.

Even in that situation, while being fitted over the outer circumferential surface of the rear shaft 41R, the rear planetary gear 43 can be mated with the rear sun gear 33 and the rear ring gear 23. That is, the rear planetary gear 43 may be rotated (about its own axis) around the axis of the rear shaft 41R by such an amount as corresponding to the phase shift of the rear sun gear 33 around the axis with respect to the front sun gear 32. While being fitted over the outer circumferential surface of the rear shaft 41R, the rear planetary gear 43 can be thereby mated with the rear sun gear 33. Further, for the reason described in relation to step H, the rear planetary gear 43 can also be mated with the rear ring gear 23.

The rear sun gear 33 and the front sun gear 32 of the sun shaft 3 need not to be necessarily integrated by rolling. It should be understood that even when the rear sun gear 33 and the front sun gear 32 are integrated by a method other than rolling, the gears 32 and 33 around the axis of the sun shaft 3 are preferably in phase.

The retainer jig 66 may be removed before the rear planetary gear 43 is attached to the rear shaft 41R. Even in this case, the effect as in (1) in the above embodiment can also be provided. As in the above embodiment, however, the retainer jig 66 may be removed after the rear planetary gear 43 has been attached to the rear shaft 41R. This can further ensure that the fork portions 69 of the retainer jig 66 prevents the tilt of the planetary shaft body 41 with respect to the sun shaft 3 while the rear planetary gear 43 is being fitted over the rear shaft 41R.

The rear ring gear 23 may be integrated with the ring shaft body 21, thereby eliminating step G mentioned above.

The invention claimed is:

1. A method for fabricating a rotational-to-linear motion conversion mechanism, the conversion mechanism including
    a pipe-shaped ring shaft having a female thread on its inner circumferential surface at its longitudinal center portion,
    a sun shaft disposed inside the ring shaft to extend coaxially with the ring shaft, the sun shaft having a male thread on its outer circumferential surface at its longitudinal center portion,
    a plurality of planetary shafts disposed between the outer circumferential surface of the sun shaft and the inner circumferential surface of the ring shaft to extend in the same direction as do the sun shaft and the ring shaft, each of the planetary shafts having a male thread on its outer circumferential surface at its longitudinal center portion, the male thread being mated with the female thread of the ring shaft and the male thread of the sun shaft,
    a first ring gear secured to an inner circumferential surface of a first longitudinal end portion of the ring shaft,
    a first sun gear integrated on an outer circumferential surface of a first longitudinal end portion of the sun shaft,
    a first planetary gear integrated on an outer circumferential surface of a first longitudinal end portion of the planetary shaft, the first planetary gear being mated with the first ring gear and the first sun gear,
    a second ring gear secured to an inner circumferential surface of a second longitudinal end portion of the ring shaft,
    a second sun gear secured to an outer circumferential surface of a second longitudinal end portion of the sun shaft, and
    a second planetary gear attached to an outer circumference of a second longitudinal end portion of the planetary shaft, to be circumferentially rotatable about its own axis and mated with the second ring gear and the second sun gear, the method comprising:
    fabricating a subassembly while each of the plurality of planetary shafts are being held in parallel to the sun shaft, wherein the subassembly includes (i) the sun shaft having the first and second sun gears, (ii) the planetary shaft having the first planetary gear, (iii) the ring shaft, and (iv) the having first and second ring gears, and
    mating a second planetary gear with the second sun gear and the second ring gear while the second planetary gear is being fitted over the outer circumferential surface of the second end portion of the planetary shaft in the subassembly.

2. The method according to claim 1, prior to the step of fabricating the subassembly, further comprising the step of integrating the first sun gear and the second sun gear with the sun shaft so that the first and second sun gears are in phase around an axis of the sun shaft.

3. The method according to claim 1, prior to the step of fabricating the subassembly, further comprising the steps of:
    disposing each of the planetary shafts circumferentially around the sun shaft and then engagedly attaching a jig extending in parallel to the planetary shaft to each adjacent first planetary gear of the planetary shafts, and
    removing the jig after the step of mating the second planetary gear.

4. The method according to claim 2, prior to the step of fabricating the subassembly, further comprising the steps of:
    disposing each of the planetary shafts circumferentially around the sun shaft and then engagedly attaching a jig extending in parallel to the planetary shaft to each adjacent first planetary gear of the planetary shafts, and
    removing the jig after the step of mating the second planetary gear.

* * * * *